June 20, 1944.  E. W. DAVIS  2,351,930
LUBRICATING SYSTEM
Filed April 16, 1941
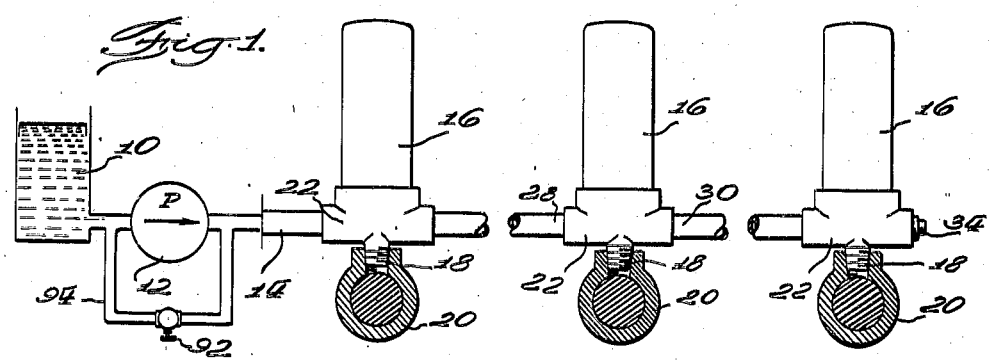
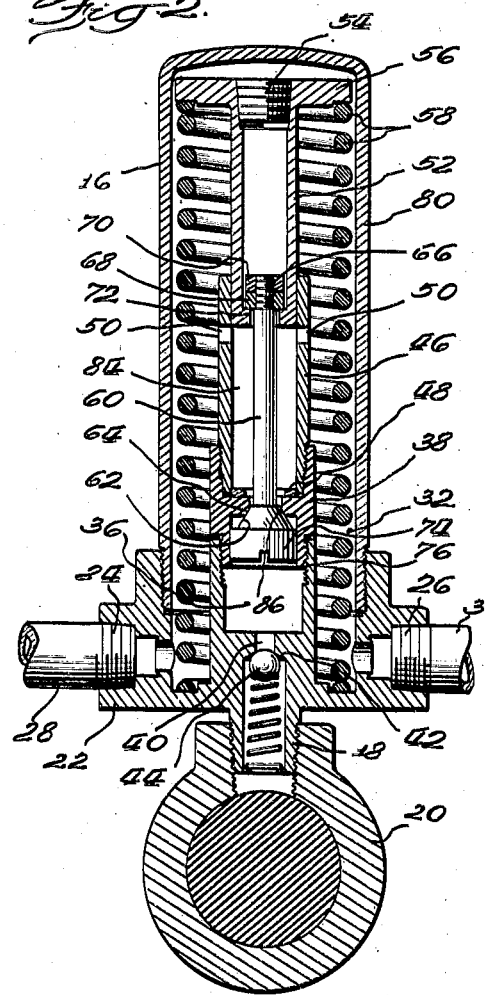
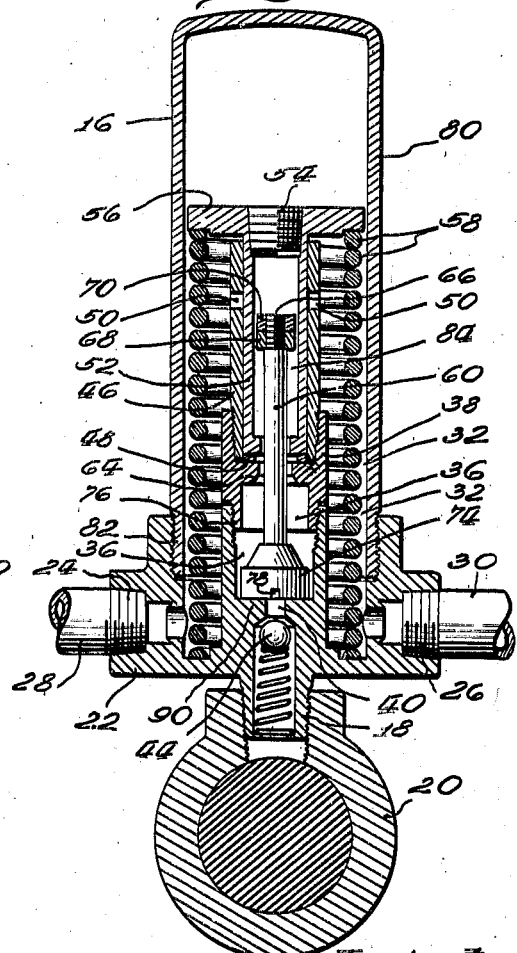
Inventor
Ernest W. Davis
By Williams, Bradbury & Shinkle
Attys.

Patented June 20, 1944

2,351,930

UNITED STATES PATENT OFFICE 2,351,930

LUBRICATING SYSTEM

Ernest W. Davis, River Forest, Ill., assignor to Stewart-Warner Corporation, Chicago, Ill., a corporation of Virginia Application April 16, 1941, Serial No. 388,774

4 Claims. (Cl. 184—7)

My invention relates to lubricating systems, and more particularly to centralized lubricating systems wherein the individual bearings are equipped with measuring valves which supply metered quantities of lubricant to their respective bearings.

An object of my invention is to provide a centralized lubricating system which is inexpensive to manufacture and install, and which accurately supplies the individual bearings with the proper amounts of lubricant.

Another object of my invention is to provide a lubricating system which can have any desired piping arrangement, and which is readily adaptable to all types of machinery.

Another object is to provide a centralized lubricating system having no critical relationship between the measuring valves and the size or length of the conduits connecting them.

Another object is to provide an improved lubricating system in which the effect of leakage occuring in any one measuring valve is confined to the particular bearing to which that measuring valve is connected.

Another object is to provide an improved measuring valve.

Another object is to provide an improved measuring valve, in which the opportunity for, and effect of, leakage are minimized.

Another object is to provide an improved measuring valve so designed that unduly close fitting of the several parts thereof is unnecessary.

Another object is to provide an improved measuring valve in which the operation of supplying lubricant to the bearing cannot take place until after the measuring chamber has been completely filled with lubricant.

Other objects and advantages will become apparent as the description proceeds.

In the drawing:

Fig. 1 is a diagrammatic illustration of a lubricating system embodying my invention;

Fig. 2 is an enlarged sectional view through one of the measuring valves and bearings shown in Fig. 1; and Fig. 3 is a view similar to Fig. 2, but showing the parts in a different position.

In Fig. 1, I have diagrammatically illustrated a centralized lubricating system having a lubricant container 10 connected to a pump 12, which may be either hand or power operated. The pump 12 discharges the lubricant under pressure into one or more pipe lines 14, which may be arranged in parallel or any other desired arrangement. In this figure, the pipe line 14 is illustrated as including at least three measuring valves 16, although it is to be understood that my improved lubricating system may incorporate any number and desired arrangement of measuring valves.

Each of the measuring valves 16 is provided with a threaded nipple 18 for attachment to the bearings 20.

Referring more particularly to Figs. 2 and 3, it will be seen that each measuring valve comprises a casting 22 having a part forming the nipple 18 for attaching the measuring valve to one of the bearings 20. The casting or base 22 is shown as having two opposed openings 24 and 26, threaded for attachment to pipes such as the pipes 28 and 30. Both threaded openings or ducts 24 and 26 communicate with a chamber 32, and either opening may form the inlet opening through which lubricant is supplied to the chamber 32. The other opening may be connected either to another measuring valve or may be closed by a plug like the plug 34 of Fig. 1.

The base 22 provides a lower portion of the valve chamber 36, the upper portion of this chamber being formed by the lower end of a union 38. A port 40 leads to a valve seat 42 normally closed by a spring pressed valve 44 in the hollow nipple 18 to cut off communication between the valve chamber 36 and the bearing surfaces of the bearing 20.

A cylinder 46 is threaded or otherwise secured to the upper end of the union 38, and a sealing washer 48 is clamped between the lower end of the cylinder 46 and a shoulder formed in the union 38. The cylinder 46 has ports 50 which establish communication between the interior of this cylinder and the chamber 32.

A hollow piston 52 is adapted to reciprocate in the cylinder 46, the upper end of this hollow piston being closed by a plug 54. The upper end of the piston 52 has a flange 56 forming a seat for a spring 58 located between the flange 56 and an annular recess formed in the base 22.

Upward movement of the piston 52 under the thrust of the spring 58 is limited by a valve member 60 having a tapered valve portion 62 engageable with a valve seat 64 provided by the union 38. The upper end of the valve member 60 extends through an opening in the face of the piston 52 and is threaded as indicated at 66 to receive nut 68 and lock nut 70. In Fig. 2 the piston 52 is shown in its uppermost position with flange 72 engaging nut 68 and valve member 60 in sealing engagement with valve seat 64.

The valve member 60 has an enlarged head 74 having the same diameter as the lower end 76 of the union 38, so that the head 74 functions as a piston while within the portion 76 of the union 38. The head 74 has a diametral channel 78 permitting lubricant to flow through the valve chamber 36 and around the head 74 into the outlet port 40 when the parts are in the position shown in Fig. 3.

A cover 80 is threadedly attached to the base 22 as indicated at 82. This cover encloses and protects the operating parts of the measuring valve and also defines the chamber 32 into which lubricant supplied by the pump 12 is admitted.

In the operation of my new and improved lubricating system, the pump 12 is supplied with lubricant from the reservoir 10, which may be either an integral part of the pump structure or entirely separate therefrom. The pump discharges this lubricant into one or more pipe lines incorporating like or unlike numbers of measuring valves 16.

In the particular arrangement shown in Fig. 1, the lubricant enters the first measuring valve through the threaded inlet 24 and flows into the chamber 32. The lubricant supplied by the pump completely fills the chamber 32 and flows through the ports 50 into the measuring chamber 84 provided by the cylinder 46.

At the same time the lubricant is filling the chambers 32 and 84, it is free to flow through the outlet 26 and pipe 30 to the succeeding measuring valves in the pipe line and to fill the chambers 32 and measuring chambers 84 either simultaneously or successively, depending upon the particular elevations of the several measuring valves and the fluidity of the particular lubricant used.

After all of the pipe lines and chambers 32 and 34 of all of the measuring valves connected to the pump 12 have been filled with lubricant, further operation of the pump increases the lubricant pressure in the system. This lubricant pressure acts upon the exposed annular portions 86 of the valve members 60 and tends to urge these valve members downwardly away from their seats 64. This movement of the valve members 60 is resisted by the springs 58. The measuring valves may be so designed that any desired lubricant pressure will be required to move the valve members 60 downwardly against the resistance of the springs 58, and I have found that excellent results follow when these measuring valves are so designed that the operation of the measuring valves is initiated by the downward movement of the valve members 60 when the lubricant pressure reaches a value of approximately 1600 pounds per square inch.

In manufacturing the measuring valves, normal variations in the sizes of the several parts of the measuring valves will result in producing measuring valves which initiate their operation at slightly different lubricant pressures. This is advantageous in that no two measuring valves will start to operate at identically the same pressure. A feature of my measuring valve lies in the fact that once the operation of a measuring valve has been initiated, the lubricant pressure in the system immediately drops until after the operation of that measuring valve has been completed, so that in a lubricating system embodying my invention, the measuring valves operate one at a time, even though no particular sequential arrangement be provided.

As soon as the valve member 60 moves from its seat 64, the entire head 74 is exposed to the lubricant pressure. This head functions as a piston in the portion 76 of the union 38, so that the lubricant pressure acting on the upper surface of this head causes the valve member to pull the piston 52 downwardly against the tension of spring 58. The head 74 is preferably made with an effective area several times the area of the valve member 60 which is exposed to lubricant pressure before this valve member moves away from its seat 64, and I have found that a ratio of 4 to 1 is entirely satisfactory.

With this ratio, four times the force is available to overcome the resistance of the spring 58 as soon as valve member 60 moves away from its seat 64, and the result is that the valve member 60 and piston 52 descend rapidly. This relieves the pressure in the lubricating system until the piston 52 has completed its downward movement, and precludes the operation of any other measuring valve until the movement of the piston 52 has been completed.

As the piston 52 moves downwardly, it closes the ports 50 and isolates the lubricant in the measuring chamber 84. Further descent of the piston 52 due to the pressure of the lubricant on the upper end thereof forces the lubricant in the measuring chamber 84 through the valve seat 64 and displaces a corresponding amount of lubricant into the bearing 20. The piston 52 and head 74 are of the same diameter, so that the lubricant can flow freely from the measuring chamber 84 into the upper end of the valve chamber 36 while the head 74 is still in the portion 76 of union 38. After the head 74 passes into the enlarged lower end of the valve chamber 36 and comes to rest against the end wall 90 of this chamber, the piston 52 continues its descent and lubricant is forced past the head 74 and through channel 78 to outlet 40 leading to the bearing surfaces.

When the piston 52 has completed its downward stroke it forms a sealing engagement with the gasket 48, thereby preventing the flow of further lubricant into the valve chamber 36 under the pressure created by the pump 12. This position of the parts is shown in Fig. 3, and the parts of the measuring valve remain in this position until all other measuring valves in the system have completed their operation, and pressure on the piping and measuring valves is relieved by opening a relief valve 92. In Fig. 1, this relief valve is illustrated as being located in a by-pass 94, but would ordinarily be an integral part of the pump 12.

When the pressure in the lubricating system is relieved, the parts of the measuring valves return to the position shown in Fig. 2. As the piston 52 and valve member 60 are returned to initial position by spring 58, the check valve 44 in the nipple 18 prevents back flow of lubricant from the bearing 20 into valve chamber 36. A suction is created in measuring chamber 84 by return movement of piston 52, and this suction is partly or wholly relieved as the piston 52 uncovers the ports 50. If relief of this suction does not suffice to fill completely the measuring chamber 84, this chamber will be completely filled by lubricant pressure created by the pump 12 before valve member 60 is again moved from its seat 64 to initiate another operation of the measuring valve. Particular attention is called to the fact that the poppet valve 60 is located between the measuring chamber and the bearing, thereby preventing initiation of measuring valve operation until after the measuring chamber has been completely filled with lubricant and the predetermined lubricant pressure to initiate operation is available at the discharge outlet of the measuring chamber.

As soon as the poppet valve 60 leaves its seat several times the force necessary to overcome the spring 58 is immediately available, with resulting rapid descent of the piston 52. This rapid descent minimizes the opportunity for leakage. Furthermore, during the period the piston 52 is moving to close the ports 50, direct access to the outlet 40 from the measuring chamber 84 is cut off by the head 74, so that at no time is there direct communication between the outlet 40 and the lubricant in the chamber 32 and piping connected thereto.

From the foregoing, it will be apparent that I have provided a new and improved lubricating system which can be readily installed on any type of machinery, and that my lubricating system can be inexpensively made of parts produced by conventional methods, and with normal tolerances.

My new and improved lubricating system is particularly adapted for use where the lubricant to be supplied to the bearing is grease, although my lubricating system may also be used with oil or other lubricants.

While I have illustrated and described in detail only one form of my invention, it is to be understood that my invention may assume numerous forms, and is to be construed as including all variations falling within the scope of the appended claims.

I claim:

1. A measuring valve comprising means providing a valve chamber, a cylinder providing a measuring chamber, there being a passageway connecting said chambers, a poppet valve normally closing said passageway, a piston reciprocable in said cylinder for discharging lubricant from said cylinder into said valve chamber, a spring for moving said piston and valve in one direction, means connecting said piston and valve for simultaneous movement, a cover providing a lubricant chamber enclosing said piston and spring, a single inlet for said cover, said inlet being adapted for connection to a source of lubricant under intermittent pressure, a port connecting said last named chamber with said cylinder, and a valved passage connecting said valve chamber with a bearing surface.

2. A measuring valve comprising a base having a pair of opposed passages, a cover attached to said base and cooperating therewith to provide a lubricant chamber communicating with said passages, a cylinder having a port communicating with said chamber, a piston reciprocable in said cylinder, a spring for urging said piston in one direction, a valve limiting movement of said piston under the influence of said spring, means including said base providing a valve chamber communicating with said cylinder to receive lubricant discharged therefrom, said valve controlling said communication, said valve having an enlarged head and said valve chamber having a portion of reduced diameter forming a cylinder for said head, means engaged by said piston at the end of its discharge stroke for sealing communication between said valve chamber and said first mentioned chamber, and a valved discharge passage for said valve chamber.

3. A measuring valve adapted for connection to a source of lubricant under intermittent pressure and operated by such pressure, said valve including a measuring chamber, a piston reciprocable therein, an inlet port for said measuring chamber controlled by said piston, a two diameter valve chamber communicating with said measuring chamber, means providing a duct for connecting said valve chamber with a bearing surface, a poppet valve having a sealing surface and an enlarged head fitting the smaller of said two diameters, means connecting said valve and piston whereby movement of said valve under lubricant pressure moves said piston to close said port, and a spring for returning said piston.

4. A measuring valve adapted for connection to a source of lubricant under intermittent pressure and operated by such pressure, said valve comprising a measuring chamber, a piston reciprocable in said measuring chamber and operable in one direction by lubricant pressure, a spring for returning said piston, means for connecting said measuring valve with a bearing surface, a two diameter valve chamber interposed between said measuring chamber and associated bearing surface, a resiliently closed poppet valve controlling communication between said measuring chamber and said valve chamber, said poppet valve having a sealing surface and a head closely fitting the smaller diameter of said valve chamber, and means connecting said poppet valve and piston whereby movement of said poppet valve under lubricant pressure creates a corresponding movement of said piston.

ERNEST W. DAVIS.